(12) United States Patent
Vance et al.

(10) Patent No.: US 10,124,277 B2
(45) Date of Patent: Nov. 13, 2018

(54) PROCESS ADDITIVE FORMULATION AND METHOD FOR FOAM REDUCTION AND/OR FOR INCREASING DRAINAGE

(71) Applicant: Kemira Oyj, Helsinki (FI)

(72) Inventors: Fredrick Vance, Woodstock, GA (US); Robert Wilson, Marietta, GA (US)

(73) Assignee: Kemira Oyj, Helsinki (FI)

( * ) Notice: Subject to any disclaimer, the term of this patent is extended or adjusted under 35 U.S.C. 154(b) by 124 days.

(21) Appl. No.: 15/037,337

(22) PCT Filed: Nov. 18, 2014

(86) PCT No.: PCT/FI2014/050868
§ 371 (c)(1),
(2) Date: May 18, 2016

(87) PCT Pub. No.: WO2015/071551
PCT Pub. Date: May 21, 2015

(65) Prior Publication Data
US 2016/0288020 A1  Oct. 6, 2016

Related U.S. Application Data

(60) Provisional application No. 61/905,333, filed on Nov. 18, 2013.

(30) Foreign Application Priority Data

Nov. 19, 2013  (FI) ..................................... 20136149

(51) Int. Cl.
| | | |
|---|---|---|
| B01D 19/04 | (2006.01) | |
| C08K 5/11 | (2006.01) | |
| C08L 33/08 | (2006.01) | |
| C08L 33/10 | (2006.01) | |

(52) U.S. Cl.
CPC ............ *B01D 19/0404* (2013.01); *C08K 5/11* (2013.01); *C08L 33/08* (2013.01); *C08L 33/10* (2013.01); *B01D 2251/21* (2013.01)

(58) Field of Classification Search
CPC ... B01D 19/0404; B01D 2251/21; C02F 1/20; C02F 1/40; C02F 7/00; C08L 33/06; C08L 33/08; C08L 33/10; C08L 33/12; C08L 2666/14; C08F 220/06; C08F 220/18; C08F 220/26; C08K 5/11; C08K 5/12
See application file for complete search history.

(56) References Cited

U.S. PATENT DOCUMENTS

| | | |
|---|---|---|
| 3,166,508 A | 1/1965 | Fields |
| 4,021,365 A | 5/1977 | Sinka et al. |
| 4,107,073 A | 8/1978 | Maciaszek |
| 4,559,162 A | 12/1985 | Abel et al. |
| 4,664,844 A | 5/1987 | Bergold et al. |
| 5,152,925 A | 10/1992 | Furman |
| 7,763,664 B2 | 7/2010 | Bonn et al. |
| 8,236,889 B2 | 8/2012 | Martin et al. |
| 8,362,095 B2 | 1/2013 | Schwab et al. |
| 2010/0292380 A1* | 11/2010 | Martin ............... B01D 19/0404 524/314 |
| 2011/0213053 A1 | 9/2011 | Wu et al. |

FOREIGN PATENT DOCUMENTS

| | | |
|---|---|---|
| CN | 1765459 A | 5/2006 |
| CN | 1994512 A | 7/2007 |
| DE | 19847423 A1 | 6/1999 |

OTHER PUBLICATIONS

Chinese Patent Office, Chinese patent application No. 2014800629134, Search Report dated Dec. 21, 2016.
Finnish Patent and Registration Office Search report of Finnish priority application No. 20136149 dated Aug. 6, 2014.

* cited by examiner

*Primary Examiner* — Lucas A Stelling
(74) *Attorney, Agent, or Firm* — Berggren LLP

(57) ABSTRACT

The invention relates to a process additive formulation and a method for foam reduction and/or for increasing drainage in a process comprising an aqueous medium. The process additive formulation comprises an acrylate and/or methacrylate copolymer, optionally with acrylic acid or methacrylic acid, in an organic diluent, and mineral oil or vegetable oil.

13 Claims, No Drawings

PROCESS ADDITIVE FORMULATION AND METHOD FOR FOAM REDUCTION AND/OR FOR INCREASING DRAINAGE

PRIORITY

This application is a U.S. national application of the international application number PCT/FI2014/050868 filed on Nov. 18, 2014 and claiming priority of US provisional application number 61/905,333 filed on Nov. 18, 2013, and of Finnish national application FI20136149 filed on Nov. 19, 2013, the contents of all of which are incorporated herein by reference.

The present invention relates to a process additive formulation and method for foam reduction and/or for increasing drainage according to the preambles of the enclosed independent claims.

Different defoaming compositions are used in different industries to control foaming, for example in pulp and paper industry. The purpose of defoaming compositions is to reduce the foam formation or prevent it completely. Various different defoaming compositions are known.

Document U.S. Pat. No. 8,236,889 discloses a defoamer formulation that does not contain oil ethylene bis-stearamide or free silicone. The defoamer formulation of U.S. Pat. No. 8,236,889 have many advantageous properties, but it has been found out that it some applications the obtained defoamer formulation do not have optimal miscibility profile, which may reduce its performance.

In many processes comprising liquid(s) and particular material not only the foaming is a problem, but also the drainage, i.e. separation of water from the particular material. There is a need for process additive formulation that would both show defoaming properties and simultaneously improve the drainage.

It is an object of the present invention to reduce or even eliminate the above-mentioned problems appearing in prior art.

One object of the present invention is to provide a process additive formulation, which is suitable for use as an antifoaming and/or defoaming agent, and which has miscibility profile, which can be easily adjusted according to the needs of a particular process.

In order to realise the above-mentioned objects, among others, the invention is characterised by what is presented in the characterising parts of the enclosed independent claims.

Some preferred embodiments according to the invention are disclosed in the dependent claims presented further below.

Typical process additive formulation according to the present invention for foam reduction and/or for increasing drainage in a process comprising an aqueous medium, comprises
- an acrylate and/or methacrylate copolymer, optionally with acrylic acid or methacrylic acid, in an organic diluent, and
- renewable oil or mineral oil.

Typical method according to the present invention for reducing foaming and/or increasing drainage in a process, which comprises an aqueous process medium with optional particulate solid material, comprises an addition of a process additive formulation comprising
- an acrylate and/or methacrylate copolymer, optionally with acrylic acid or methacrylic acid, in an organic diluent, and
- renewable oil or mineral oil,
to the aqueous process medium.

In typical method according to the present invention for manufacturing a process additive formulation for foam reduction and/or for increasing drainage in a process comprising an aqueous process medium, a renewable oil or mineral oil is added to a liquid phase comprising an acrylate and/or methacrylate copolymer, optionally with acrylic acid or methacrylic acid, in an organic diluent.

In context of the present application the terms "aqueous medium" or "aqueous process medium" are used synonymously and interchangeably and they are understood as a liquid medium in which water is the main constituent, and which may comprise solid material, such as particles, fibers, filaments, flocs or the like.

Preferably aqueous medium comprises water at least 40 weight-%, more preferably at least 50 weight-%. The aqueous medium may be water that is completely clear, water that is devoid of particular material, a colloidal suspension, or pulp slurry, or the like.

In context of the present application all parts and percentages are by weight unless otherwise specified.

Now it has been surprisingly found out that a process additive formulation comprising an acrylate and/or methacrylate copolymer in an organic diluent, optionally polymerized in the presence of acrylic acid or methacrylic acid, as well as renewable oil or mineral oil, provides unexpected advantages in various industrial processes, especially in processing paper and pulp, particularly for improving drainage on pulp washers, increasing liquor solids, and for lowering dirt counts in the pulp and in the resulting paper. The process additive formulation is easy and inexpensive to produce and provides an unanticipated improvement both in foam control as well as in drainage properties at small dosage amounts. The formulation may not only reduce the foam amount but also prevent the foam formation in the first place. It was surprisingly realized that when process additive formulation is manufactured by addition of renewable oil or mineral oil to the copolymer in an organic diluent, the addition of the oil introduces a low surface tension component to the process additive formulation, thus allowing for more efficient use of the formulation in various processes.

Alkyl acrylate or alkyl methacrylate copolymer, preferably terpolymer, of the process additive formulation may be obtained by polymerizing a monomer premix, which comprises alkyl acrylate monomers and/or alkyl methacrylate monomers, in which the alkyl group is linear or branched and comprises 1 to 18 carbon atoms, preferably 2-10 carbon atoms. The alkyl group of the monomer may comprise at least one hydroxy group anywhere on the alkyl group chain. According to one preferred embodiment of the invention acrylate and/or methacrylate monomers, which may be used, include 2-ethylhexyl (meth)acrylate, 1-hydroxyethyl (meth)acrylate, 2-hydroxyethyl (meth)acrylate, 1-hydroxypropyl acrylate, 2-hydroxypropyl (meth)acrylate, 3-hydroxypropyl (meth)acrylate, 1-hydroxyisopropyl (meth)acrylate, 2-hydroxyisopropyl (meth)acrylate, 3-hydroxyisopropyl (meth)acrylate, 1-hydroxybutyl (meth)acrylate, 2-hydroxybutyl (meth)acrylate, 3-hydroxybutyl (meth)acrylate and 4-hydroxybutyl (meth)acrylate. Preferred acrylate monomers include 2-ethylhexyl acrylate, 2-hydroxyethyl acrylate and acrylic acid.

Preferred methacrylate monomers include 2-ethylhexyl methacrylate, 2-hydroxyethyl methacrylate, and/or methacrylic acid. The acrylate monomers are being more preferred of the listed monomers.

According to one advantageous embodiment the copolymer suitable for the use in the present invention is obtained by polymerization of alkylacrylate monomers and/or alkyl methacrylate monomers and hydroxyalkyl acrylate monomers, preferably in presence of acrylic acid or methacrylic acid. It has been observed that the addition of acrylic acid or methacrylic acid to the monomer premix improves the performance of the process additive formulation as antifoaming and/or defoaming agent and/or drainage aid.

The copolymers suitable for the use in the present invention may be prepared in any suitable manner known to a person skilled in the art. For example, they may be prepared in an organic diluent in the presence of a free radical generating catalyst with or without the addition of acrylic acid or methacrylic acid to the monomer premix. Catalysts suitable for use may be selected from, but not limited to, 2,2'-azobis(2-methylpropanenitrile), 2,2'-azobis(2,4-dimethylpentanenitrile), or 2,2'-azobis(2-methylbutanenitrile). Preferably the free radical generating catalyst is 2,2'-azobis(2-methylpropanenitrile). It is also possible to use redox catalyst systems such as bromate/sulfide or persulfate/ferrous systems. Furthermore, peroxides such as benzoyl peroxide may be used to generate the free radicals.

The amount of acrylic acid and/or methacrylic acid that may be used in the monomer premix for the preparation of the copolymers is selected from, but not limited to, up to about 25 mol-% of the final copolymer, preferably from about 1 to 20 mol-% of the copolymer, even more preferably about 8 mol-% of the copolymer.

According to one embodiment of the present invention the organic diluent is selected from diisodecyl phthalate, diisooctyl adipate, diisooctyl phthalate, diethylhexyl adipate, dioctyl adipate, 2-ethyl-1-hexanol, isooctyl alcohol, dihexyl phthalate, and mixtures thereof. Preferably the organic diluent is diethylhexyl adipate, diisodecyl phthalate or diisooctyl adipate, more preferably diethylhexyl adipate.

According to one embodiment of the invention the mineral oil is selected from synthetic oil or refined oil, such as kerosene, diesel oil, paraffinic oil or naphthenic oil. Synthetic oil is a mineral oil produced by using Fischer-Tropsch process or similar polymerization process. Refined oils may be cracked, treated by solvent extraction and/or hydrotreated. Kerosene, diesel oil, paraffinic oil and naphthenic oil are obtained from a crude oil by refining and distillation. Paraffinic oil may comprise paraffinic or cycloparaffinic hydrocarbons or both. The viscosity of the used mineral oil may be 50-300 cSt, preferably 60-200 cSt, more preferably 75-125 cSt.

According to another embodiment of the invention the process additive formulation comprises renewable oil. Renewable oil is here understood as oil produced from renewable sources, such as plants and/or animals. Examples of renewable oils are different types of biodiesel and vegetable oils, such as rapeseed oil.

According to one embodiment of the invention the process additive formulation comprises in addition to mineral oil an organic carrier agent, which may be selected from, but not limited to, polybutenes having a molecular weight of from about 300-1300 Da; dialkyl phthalates; fatty acid esters; polyethylene glycol or polypropylene glycol or esters thereof; and any mixtures thereof. Preferably the organic carrier agent is a polybutene having a molecular weight of from about 300-1300 Da or polypropylene glycol, more preferably polypropylene glycol.

According to one preferred embodiment of the present invention the process additive formulation comprises
  a copolymer which is a terpolymer of an alkyl acrylate and a hydroxyalkyl acrylate with acrylic acid, in an organic diluent which is diethylhexyl adipate, and
  mineral oil which is selected from synthetic oil, paraffinic oil or naphthenic oil, and
  optionally an organic carrier agent, which is polypropylene glycol.

It has been noticed that this process additive formulation is advantageous for foam control and drainage enhancement in process of washing pulp, such as cellulose pulp.

The process additive formulation may further comprise a surfactant, which is selected from, but not limited to, polypropylene triol, butoxy polypropylene-polyethylene glycol, alkoxylated dimethylpolysiloxane, alkyl modified siloxanes, fluorine modified siloxanes, mercapto modified siloxanes, hydroxy modified siloxanes, siloxane wax, ethylene oxide/propylene oxide block copolymer, the esters of polypropylene triol, butoxy polypropylene polyethylene glycol, ethylene oxide/propylene oxide block copolymer, alkylpolyoxyethylene ethers, alkylpolyoxyethylenes, polyoxypropylene ethers, fatty acid polyoxyethylene esters, fatty acid polyoxyethylene sorbitan esters, fatty acid polyoxypropylene sorbitol esters, polyoxyethylene castor oils, alkylpolyoxyethylene amines and amides, fatty acid sorbitan esters, fatty acid polyglycerin esters, fatty acid sucrose esters, and the like. Preferably the surfactant is a siloxane or polypropylene-polyethylene glycol, more preferably polyether-modified polysiloxane or alkyl modified siloxane.

The process additive formulation may further comprises one or more additive agents selected from, but not limited to, hydrophobic silica, waxes, fatty alcohols, fatty acid esters, fatty alcohol esters, fatty acids and diamides, such as ethylene bis-stearamide (EBS). According to one preferred embodiment the additive agent is hydrophobic silica and/or ethylene bis-stearamide. The total amount of additive agent in the final process additive formulation is normally less than 15%, preferably less than 10%, more preferably less than 5%, of the weight of the final formulation.

According to one embodiment of the invention one or more additive agents selected from hydrophobic silica, waxes, fatty alcohols, fatty acid esters, fatty alcohol esters, fatty acids and diamides, such as ethylene bis-stearamide (EBS), are added to the liquid phase simultaneously with the renewable oil or mineral oil. According to one embodiment the additive agent is diamide, whereby the typical amount of diamide in the process additive formulation may be between about 2 and 10% of the weight of the final composition. According to one embodiment of the present invention the additive agent is ethylene bis-stearamide, which is a hydrophobic molecule. The oil functions as a vehicle for introducing additive agents in effective manner and enables also the addition of particulate additive agents, such as hydrophobic silica and ethylene bis-stearamide.

According to another embodiment of the present invention the process additive formulation is essentially free from silica, silicone, and silicone surfactant. The process additive formulation, which is free from silica, silicone, and silicone surfactant is especially suitable for use in pulp processes, which have silicon chemistry limitations or restrictions on chemicals used in pulp manufacturing.

According to one embodiment of the invention the amount of copolymer in the organic diluent is 20-90% of the weight of the process additive formulation, preferably 30-85% of the weight of the process additive formulation, more preferably 50-80% of the weight of the process additive formulation, even more preferably 60-75% of the weight of the process additive formulation.

According to one embodiment of the invention the amount of mineral oil is 0.5-80 of the weight of the process additive formulation, preferably 1-60% of the weight of the process additive formulation, more preferably 5-50% of the weight of the process additive formulation, even more preferably 10-40% of the weight of the process additive formulation. These mineral oil amounts allow an optimal and efficient foam control.

According to one embodiment of the invention the amount of organic carrier agent is 5-75% of the weight of the process additive formulation, preferably 7-60% of the weight of the process additive formulation, more preferably 10-50% of the weight of the process additive formulation, even more preferably 10-40% of the weight of the process additive formulation. These organic carrier agent amounts allow an optimal and efficient drainage.

The dosage or feed rate of the process additive formulation may be 1-50 parts per million (ppm), preferably 3-30 ppm, more preferably 5-20 ppm, depending on the process or application conditions.

The process additive formulation of the present invention is also useful in the petroleum industry, water treatment, paints and coatings, food and beverage processing, the mining industry, textiles, agriculture, and the like. It may be used in several industrial applications including, but not limited to:

i) controlling or destroying foam in various alkaline or acidic processes associated with pulp or paper processing, such as in the Kraft pulping process, sulfite pulping process, thermomechanical pulping (TMP) process, chemical thermomechanical pulping (CTMP) process, groundwood pulping process, carbonate pulping process, paper machine applications, screen room applications, bleach plant applications, or the like;

ii) efficiently decreasing foam production during preparation of cement slurries and controlling flow properties of cement by minimizing air entrainment in the cement slurry. The minimization of air entrainment in the cement slurry also results in a more structurally sound cement lattice;

iii) increasing drilling efficiency in oil wells by minimizing the effects of unwanted air. For example, when added to an oil well, the process additive formulation effectively lowers the interfacial tension of the crude oil, thus allowing entrained gas to easily escape, and leading to increased drilling efficiency. In addition, the process additive formulation also effectively controls air entrainment in crude oil during the heating process in distillation columns.

iv) controlling foam production during treatment of waste water in municipal and commercial settings, such as clarifiers, flumes, outfalls, effluent ponds. Further, the process additive formulation also effectively controls foam and air entrainment in both cold and hot applications.

According to one embodiment the invention is especially useful for foam control and/or drainage improvement in production of cellulose fibers, such as viscose, acetate or water-soluble polymers derived from cellulose, such as cellulose ethers.

The process additive formulation is particularly useful in antifoaming, defoaming and/or drainage improvement in pulp and/or paper processing, cement defoaming, lime mud dewatering in caustic recovery or processing of drilling mud fluids in oil fields. For example, the process additive formulation may be used in lime mud dewatering in caustic recovery, where the calcium oxide is recovered from calcium carbonate by heat. The recovered calcium carbonate is washed in order to reduce the amount of total reduced sulfur in calcium oxide. There is a need for effective and efficient drainage of wash water from calcium oxide. Furthermore, the process additive formulation may be used in controlling foaming in cementing process of an oil well and to ensure proper cement strength and flow.

According to one embodiment of the invention process additive formulation is used for producing pulp and the dosage of the process additive formulation is 0.2-1.5 kg per ton of pulp produced.

According to one embodiment of the invention process additive formulation is used for defoaming cement and the dosage of the process additive formulation is 1-5 ppm by weight of dry cement.

According to one embodiment of the invention process additive formulation is used for lime mud dewatering and the dosage of the process additive formulation is 0.2-2.3 kg per ton of CaO recovered.

The process additive formulation of the present invention is in no way limited only to the uses disclosed above. As such, the process additive formulation of the present invention can also be used in any industry that may require the control or destruction of foam and/or increasing retention in a filtering process.

EXPERIMENTAL

Some embodiments of the invention are described in the following non-limiting examples.

Example 1

Evaluation of Samples by Using FEAT Test:

The Foam and Entrained Air Tester (FEAT) is a testing apparatus used to determine the efficacy of defoaming agents in a laboratory setting. The apparatus measures the change in the density as a function of time of the filtrate as the defoaming agent is introduced. The measure of the change in density of a filtrate is a direct measurement of the change in entrained air. In pulp and paper mills, presence of entrained air can disturb sheet formation and drainage.

Testing of the samples utilizes a recirculatory foam cell attached to a pump. The hose leading from the pump is connected to a density meter, which is connected back to the top of the foam cell. Black liquor from the first stage washer from a North American Southern Kraft process mill is used in all of the testing. The liquor is heated to 85° C. The heated black liquor is added to the test unit and pumped through the unit to fill the lines. The level of the liquor is then lowered to the 19 cm mark on the tube before the test is started. The motor speed for pump is set at 60%. Once the pump is turned on and the density dropped due to air entrainment to 0.90 g/ml, 100 µl of defoaming agent is added. The test are run for at least of 200 seconds until at least 400 data points are collected (the FEAT unit collects 1 data point every 0.5 seconds). A line graph is then generated to show the change in density of the liquor of the time period. The area under the curve for each test is then calculated. There are two different areas calculated: the area under the curve during the first 30 seconds is calculated to provide a measure of the initial deaeration of the sample, and the area under the curve for the total test time is calculated to provide a measure of the overall performance of each sample. Those samples having the highest area under the curve measurements are those samples that performed the best. All tests were run in duplicate and the averages of the two runs are reported. The range of experimental error for this test method is +−10%.

Process additive formulations described in Table 1 are tested. All percentages in Table 1 are calculated as weight-% from total sample weight. The total sample weight is 300 g.

In the Example the copolymer is a terpolymer of hydroxyl alkyl acrylate and alkyl acrylate monomers in a diluent of diethylhexyl adipate and the mineral oil is Paraffinic 100 mineral oil.

TABLE 1

Tested process additive formulations.

| Ingredient | Formulation A | Formulation B | Formulation C |
|---|---|---|---|
| Co-polymer | 70% | 70% | 70% |
| Mineral oil | 30% | 15% | 15% |
| 9% EBS | — | 15% | — |
| 4.5% EBS | — | — | 15% |

The formulations are prepared as a simple blend by placing co-polymer into a vessel and starting stirring with lab mixer by using speed of 500 rpm. In case EBS is used, it is first pre-mixed with the mineral oil. Mineral oil, with or without EBS, is slowly added to the co-polymer over approximately 90 seconds and kept under mixing for an additional 30 min, whereby a process additive formulation is obtained.

The process additive formulations are tested by using a FEAT test procedure described above. A commercial defoaming agent Fennotech 7000 (Kemira Oyj, Finland) is used as Reference 1. Results for the FEAT tests are shown in Table 2.

TABLE 2

Results for the FEAT test.

| | Reference 1 | Formulation A | Formulation B | Formulation C |
|---|---|---|---|---|
| 1$^{st}$ 30 seconds Area | 8.03 | 6.31 | 6.78 | 6.67 |
| Total Runtime Area | 54.71 | 46.33 | 47.11 | 47.21 |

It can be seen from Table 2 that the process additive formulation according the present invention provides an initial deaeration and overall performance which is comparable with the commercial defoaming agent.

Example 2

Evaluation of Samples by Using Foam Cell Test Procedure:

The test unit is the same as in the FEAT test in Example 1. Black liquor from the first stage washer from a North American Southern Kraft process mill softwood line and hardwood line are used in tests. The liquor samples are heated to 82.2° C. The heated black liquor samples are added to the test unit and pumped through the unit to fill the lines. The level of the liquor sample is then filled to the 16 cm mark on the tube before the test is started. The pump is turned on and the foam is allowed to rise to a height of 25 cm. When the foam height reaches 30 cm, 250 µl of process additive formulation is added to the incoming stream of black liquor sample. This time is denoted as 0 seconds, i.e. start of measurement. The time needed (in seconds) to reach 27, 28, 29, 30, 31 and 32 cm is recorded. When the foam height reaches 32 cm the test is stopped. The amount of time to go from 30 cm to a final lowest level is referred as the knock down.

The process additive formulations described in Example 1 are tested in Example 2 by using a Foam Cell Test procedure described above. A commercial defoaming agent Aerotech 4298 (Kemira Oyj, Finland) is used as Reference 2 in Example 2. Results for the Foam Cell Test Procedure for black liquor sample from softwood line are shown in Table 3 and results for the Foam Cell Test Procedure for black liquor sample from hardwood line are shown in Table 4.

TABLE 3

Results of Example 2 for the Foam Cell Test Procedure for black liquor sample from softwood line

| | Knockdown [cm] | Time [s] |
|---|---|---|
| Formulation B | 27 | 10 |
| Formulation C | 27 | 11 |
| Reference 2 | 27 | 9 |

TABLE 4

Results of Example 2 for the Foam Cell Test Procedure for black liquor sample from hardwood line.

| | Knockdown [cm] | Time [s] |
|---|---|---|
| Formulation A | 29 | 9 |
| Formulation B | 26 | 10 |
| Formulation C | 26 | 11 |
| Reference 2 | 24 | 9 |

It can be seen from Table 3 and 4 that the process additive formulations according the present invention provide very similar results as commercial defoaming agent.

Although certain embodiments and examples have been described in detail above, those having ordinary skill in the art will clearly understand that many modifications are possible in the embodiments and examples without departing from the teachings thereof. All such modifications are intended to be encompassed within the below claims of the invention.

The invention claimed is:

1. A process additive formulation for foam reduction and/or for increasing drainage in a process comprising an aqueous medium, the process additive formulation comprising
   50%-80% of an acrylate copolymer or a methacrylate copolymer or a combination thereof in an organic diluent, wherein the acrylate copolymer is obtained by polymerization of a monomer premix comprising alkyl acrylate monomers and a hydroxyalkyl acrylate monomer and acrylic acid or methacrylic acid and the methacrylate copolymer is obtained by polymerization of a monomer premix comprising alkyl metacrylate monomers and a hydroxyalkyl acrylate monomer and acrylic acid or methacrylic acid, and
   5-50% of renewable oil or mineral oil,
   wherein the percentages are calculated on basis of the weight of the process additive formulation and the process additive formulation is free from silica, silicone, and silicone surfactant.

2. The process additive formulation according to claim 1, wherein the copolymer in the organic diluent amounts 60-75% of the weight of the process additive formulation.

3. The process additive formulation according to claim 1, wherein the amount of mineral oil is 10-40% of the weight of the process additive formulation.

4. The process additive formulation according to claim 1, wherein amount of acrylic acid or methacrylic acid or both in the monomer premix for the preparation of the copolymers is up to 25 mol-% of the polymer.

5. The process additive formulation according to claim 1, wherein the acrylate and/or methacrylate copolymer is obtained by polymerization of a monomer premix, which comprises acrylate and/or methacrylate monomers selected from the group consisting of 2-ethylhexyl (meth)acrylate, 1-hydroxyethyl (meth)acrylate, 2-hydroxyethyl (meth)acrylate, 1-hydroxypropyl acrylate, 2-hydroxypropyl (meth)acrylate, 3-hydroxypropyl (meth) acrylate, 1-hydroxyisopropyl (meth)acrylate, 2-hydroxyisopropyl (meth)acrylate, 3-hydroxyisopropyl (meth)acrylate, 1-hydroxybutyl (meth)acrylate, 2-hydroxybutyl (meth)acrylate, 3-hydroxybutyl (meth)acrylate and 4-hydroxybutyl (meth)acrylate.

6. The process additive formulation according to claim 1, wherein the mineral oil is selected from kerosene, diesel oil, paraffinic oil or naphthenic oil.

7. The process additive formulation according to claim 1, wherein the organic diluent is selected from diisodecyl phthalate, diisooctyl adipate, diisooctyl phthalate, diethylhexyl adipate, dioctyl adipate, 2-ethyl-1-hexanol, isooctyl alcohol, dihexyl phthalate, and mixtures thereof.

8. The process additive formulation according to claim 1, wherein the process additive formulation further comprises an organic carrier agent, which is selected from polybutenes having a molecular weight of from about 300-1300 Da; dialkyl phthalates; fatty acid esters; polyethylene glycol or polypropylene glycol or esters thereof; and any mixtures thereof.

9. The process additive formulation according to claim 8, wherein the amount of organic carrier agent is 5-75% of the weight of the process additive formulation.

10. The process additive formulation according to claim 1, wherein the process additive formulation comprises
a copolymer of an alkyl acrylate and a hydroxyalkyl acrylate with acrylic acid, in an organic diluent which is diethylhexyl adipate, and
mineral oil which is selected from synthetic oil, paraffinic oil or naphthenic oil, and
optionally an organic carrier agent, which is polypropylene glycol.

11. A method for reducing foaming or increasing drainage or both in a process comprising an aqueous process medium with optional particulate solid material, in which method a process additive formulation according to claim 1 is added to the aqueous process medium.

12. The method according to claim 11, wherein the process is selected from pulp and/or paper processing, cement defoaming, lime mud dewatering in caustic recovery and processing of drilling mud fluids in oil fields.

13. The method according to claim 11, wherein dosage or feed rate of the process additive formulation is 2-50 parts per million (ppm).

* * * * *